(12) United States Patent
Jenzowsky et al.

(10) Patent No.: US 8,233,771 B2
(45) Date of Patent: Jul. 31, 2012

(54) SYSTEMS, DEVICES, AND/OR METHODS FOR MANAGING PROGRAMS

(75) Inventors: Stefan Jenzowsky, Berlin (DE); Norbert Löbig, Darmstadt (DE); Rudolf Stelzl, Dachau (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 573 days.

(21) Appl. No.: 12/295,736

(22) PCT Filed: Mar. 30, 2007

(86) PCT No.: PCT/EP2007/053121
§ 371 (c)(1),
(2), (4) Date: Nov. 5, 2009

(87) PCT Pub. No.: WO2007/113264
PCT Pub. Date: Oct. 11, 2007

(65) Prior Publication Data
US 2009/0297129 A1 Dec. 3, 2009

(30) Foreign Application Priority Data
Apr. 3, 2006 (DE) .................. 10 2006 015 328

(51) Int. Cl.
*H04N 9/80* (2006.01)
(52) U.S. Cl. .................... 386/248; 386/249
(58) Field of Classification Search ......... 386/248–251, 386/291
See application file for complete search history.

(56) References Cited

U.S. PATENT DOCUMENTS

| 5,151,788 A | 9/1992 | Blum |
| 5,555,463 A | 9/1996 | Staron |
| 5,999,688 A * | 12/1999 | Iggulden et al. ............. 386/343 |
| 2005/0002644 A1* | 1/2005 | Nakamura et al. ............. 386/52 |
| 2006/0056820 A1* | 3/2006 | Wu et al. ...................... 386/126 |

FOREIGN PATENT DOCUMENTS

| DE | 69419668 T2 | 1/2000 |
| DE | 19846249 | 4/2000 |
| DE | 19849175 | 4/2000 |
| DE | 102004036013 | 12/2005 |
| EP | 0967611 | 12/1999 |
| GB | 2394618 | 4/2004 |
| WO | WO/00/21290 | 4/2000 |
| WO | WO2006/103224 | 10/2006 |

OTHER PUBLICATIONS

Ahanger & Little, "A Survey of Technologies for Parsing and Indexing Digital Video", Mar. 1, 1996, 16 pages, Journal of Visual Communication and Image Representation, vol. 7, No. 1.

* cited by examiner

*Primary Examiner* — Thai Tran
*Assistant Examiner* — Nigar Chowdhury
(74) *Attorney, Agent, or Firm* — Michael Haynes PLC; Michael N. Haynes

(57) ABSTRACT

Certain exemplary embodiments relate to a device and/or an associated method in which a recorded television or radio program can be played back from a recording of said program without additional programs, such as commercial breaks. A current program can be resumed once the recording has been played back. Processed program segments can be retrieved while repeated segments can be tuned out during playback. The current program can be resumed more quickly if processed program segments are retrieved during playback.

12 Claims, 5 Drawing Sheets

SYSTEMS, DEVICES, AND/OR METHODS FOR MANAGING PROGRAMS

CROSS-REFERENCES TO RELATED APPLICATIONS

This application is a United States National Stage entry of, claims priority to, and incorporates by reference herein in its entirety, International Application PCT/EP2007/053121, filed 30 Mar. 2007, which claims priority to German Application DE102006015328.6, filed 3 Apr. 2006.

BRIEF DESCRIPTION OF THE DRAWINGS

The invention will be explained in more detail with reference to the following drawings.

DETAILED DESCRIPTION

Figure 1:
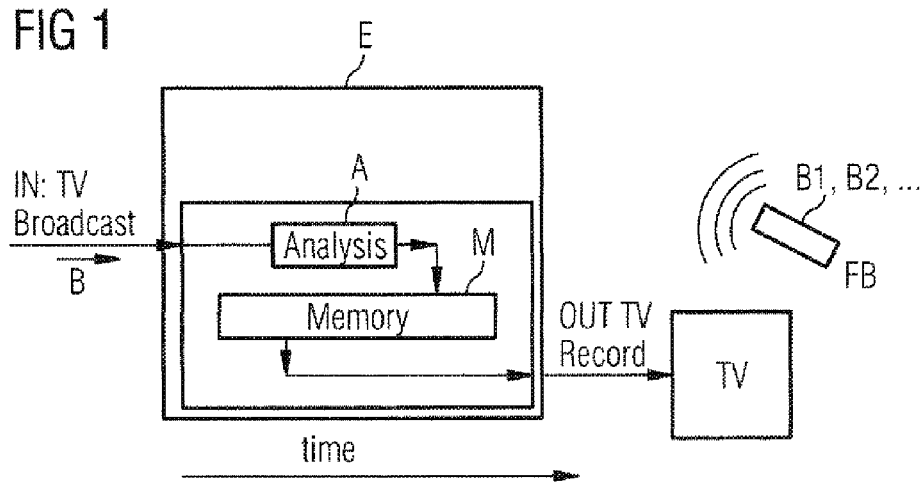
FIG. 1 shows a recording and replay arrangement.

Radio and television programs reach their viewers and listeners via a multiplicity of communication routes. In addition to terrestrial and satellite reception as well as access via cable networks, the use of communication data networks such as a landline network, mobile radio network or the Internet, is becoming increasingly important for the broadcasting of the programs that are available. The viewers and listeners can therefore access radio and television programs virtually everywhere and by any desired access means.

From experience, the probability of an interruption in the time spent in front of the receiving or multimedia appliance during a television or sound radio program increases, for example, when a locally occurring event such as a telephone call, a visit or an interruption in a television program as a result of the introduction of an advertisement block, a news item or the like, occurs.

The object of the invention is to specify an apparatus and an associated method for replaying programs at a later time.

The object is achieved by the independent patent claims 1 or 8.

The invention advantageously means that the temporarily stored sections of broadcast programs are replayed as required without additional items before jumping back to a current broadcast mode.

The invention results in the advantage that, in the event of an interruption which is caused either locally or centrally, for example an advertisement, in a program does not result in any loss of transmitted transmission sections.

The invention results in the advantage that it is possible to jump back more quickly to the real-time broadcast mode by the use of temporarily stored summaries of the transmitted transmission sections. The invention results in the advantage that only a minimum amount of memory is required for recorded programs.

The invention results in the additional advantage that it is possible to return to the real-time broadcast mode within the shortest possible time interval after the end of the interruption.

The invention results in the advantage of intrinsically simple operation.

The invention furthermore results in the advantage that categories of program items in transmitted programs or program parts can be selected from a current transmission program when being replayed.

A further advantage is that the process of returning to the real-time broadcast mode can be speeded up if required by outputting program elements which have been abbreviated in time, by means of the available summaries.

A circuit arrangement and an associated method are specified in the following text, in which it is possible to use a partial recording of a television or sound radio program to replay the recorded program without any additional items, for example advertisement blocks transmitted during this time period. After the end of the recording, which may have been cleaned up, an automatic jump is made back to the preselected currently transmitted television program. For this purpose, by way of example, a control function B1, B11, B2, . . . for net recording of programs is initiated, for recording purposes, on a remote control or on the multimedia appliance before the start of a period of absence or an interruption in the process of following the current television program.

The description of the apparatus and the associated method will be based on a scenario in which a viewer or a listener interrupts his viewing or listening and returns to the program that is available from the television or radio after an undefined period of time which has been spent in some other way. When returning to viewing or listening to the television or broadcast radio program, the viewer or listener is faced, for example, with the alternatives of either continuing to follow the net recording of the cleaned-up program with a time offset, or of immediately jumping back to the original broadcast mode. In the latter case, it is then possible to access the temporarily stored net recording at a later time. In addition, the viewer or listener can himself define his own time for viewing or listening to the eliminated temporarily stored additional items and additional programs W1, W2, W3, . . . .

One apparatus with a local recording capability is illustrated in FIG. 1. A television program or programs Bx, By is or are transmitted by means of a broadcast B, for example terrestrially, via satellite or via cable to the multimedia subscriber. The transmitted program Bx, By can then be passed on via a receiving unit E or a set-top box directly to the television or radio. In addition, an analysis unit A and an electronic module PVR are provided in the unit E that has been mentioned. The module PVR can be used to record programs. The electronic module PVR may also be in the form of a personal video recorder PVR. In parallel with the recording of the program Bx, By on the personal video recorder, this is also subjected to an analysis process relating to a small number of desired additional programs or transmission items W1, W2, W3, . . . . During this analysis process, it is possible to assess the program on a scanning-basis using a transmitter identification, such as the logo of a transmission station, since the transmission of the logo is in general suppressed during advertisement programs. An increased rate of scene changes can also be used as a criterion for identification of an advertisement block.

A further method could be based on the evaluation of a relative activity level at the start of an additional program, which is high in the case of advertisement items. Another method could be based on evaluation of signature patterns or assessment of the length of the item.

Furthermore, the analysis can also include methods which are based on reliable identification of advertisement blocks without a real-time requirement. This makes it possible to check the verification of the advertisement block boundaries in the recording which has already been made such that, during subsequent replay, it is possible to reliably exclude the undesired output of a part of an advertisement block which has not been defined cleanly on a real-time basis. The program is recorded without any additional transmission items, as is illustrated in the following figures, in real time and can be started by a first initiation I1 of a first control function B1. On a second initiation of the first control function B1, the transmission sections a, b, c, d, . . . can be passed on to the output appliance TV. The additional programs and transmission items which have been eliminated from the program can be temporarily stored and called up separately.

Figure 2:
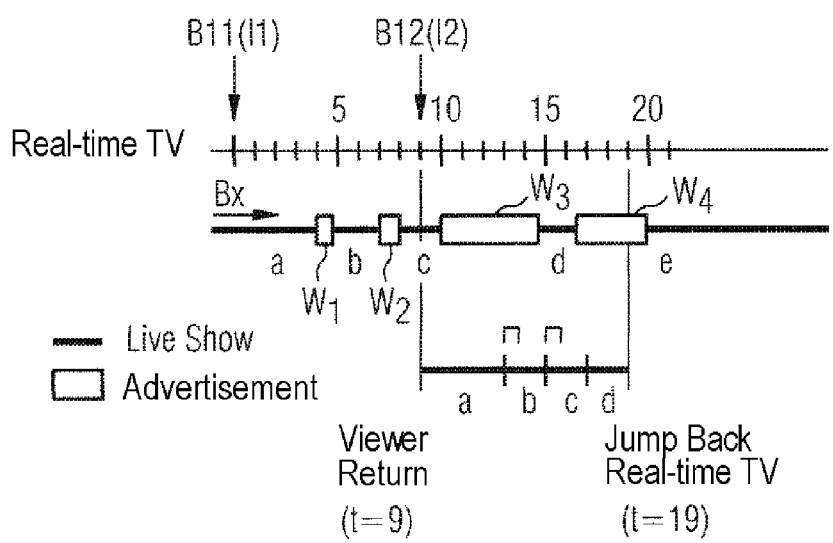
FIG. 2 shows a net recording with transmission sections.

FIG. 2 shows, schematically, the profile of a program Bx with additional items W1, W2, W3, . . . , recording of a program Bx from which additional items W1, W2, W3, . . . have been removed, with the transmission sections a, b, c, d, and an indication of a jump back to the real-time broadcast mode. In this schematic illustration, the viewer initiates (I1) the first control function B1(I1)—recording without additional inclusion of advertisement blocks. The schematic illustration shows a live program Bx (a, b, c, . . . ) which has been transmitted, for example, and interrupted by advertisement items W1, W2, W3, . . . , plotted underneath a transmission time scale. After an absence of 9 minutes, for example, the multimedia user returns to his receiving unit E again. By operating a second initiation (I2) of the first control function B1(I2), the recorded part of the program is output, with additional transmission items W1, W2, W3, . . . having been removed from it. On return, a control key or a coding, and/or a second initiation I2 of a further control function B12, can be entered in such a way that only the additional programs are replayed, after which a smooth transition is made to the current program. If a new additional transmission item, for example W3, occurs while a net recording is being output, or such an item is still being transmitted at the time of return to the live program Bx, then this is also entirely or partially eliminated during the replaying of the transmission sections a, b, c. On jumping back during an additional transmission item W4 and if the replay a, b, c, d of the cleaned-up recording has already been completed, the transmission item W4 which is currently still being transmitted could be passed on to the output unit TV. In this case, a neutral transmission item Wx which is stored individually by the multimedia subscriber in an additional memory could also be provided. After the end of the transmission item W4, a jump is made back to the program Bx or By which is currently being transmitted. A jump is then made back to the broadcast program at the time t=19 minutes after the start of the absence, or 9 minutes after the return of the viewer or listener.

Figure 3:
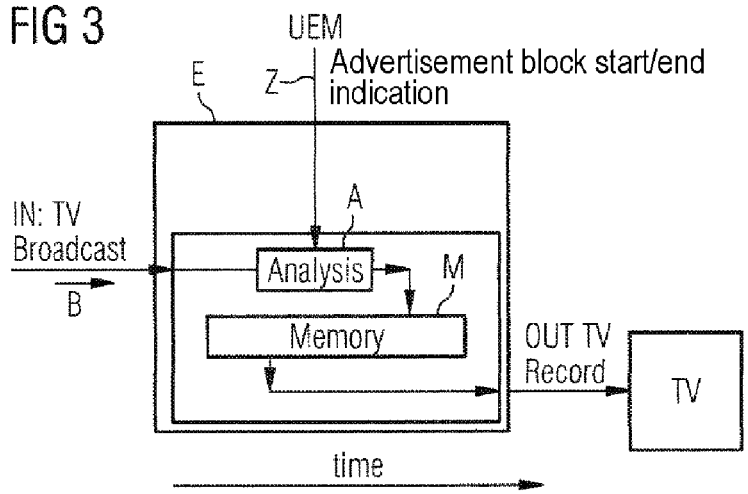
FIG. 3 shows a further recording and replay arrangement.

FIG. 3 shows an apparatus corresponding to FIG. 1. In addition, this apparatus has an access Z to a further transmission medium UEM. For example, information relating to the start and end time of additional items W1, W2, W3, . . . could be passed to the analysis appliance A via the transmission medium. In this case, advertisement blocks are preferably removed by means of an exact external indication of the start and end of the advertisement block. This information is made available by polling or on an event basis. The relevant program parts are recorded to the memory unit PVR without the identified advertisement blocks. In this case, the personal video recorder PVR does not need its own means to identify advertisement blocks. Instead of having its own autonomous advertisement block identification, the apparatus described in FIG. 1 can likewise be designed for an external advertisement block indication. This variant is preferably available, as shown in FIG. 3, for a network-based personal video recorder nPVR. This then economically covers a plurality of television channels for a multiplicity of viewers. A program is recorded centrally, as is the exact identification of the advertisement blocks. In this case, a second control function B2 accesses a request administration function for the network-based personal video recorder nPVR, with the program subsequently being individually streamed to the viewer, with the recording having been cleaned up, starting at the interruption time. The jump back to the broadcast mode is made when the subscriber exits the request administration, and when his STB is connected to the television broadcast program. A unicast link exists between the memory unit M or the set-top box STB of the output unit TV for the time during which the program, without advertisement blocks, which has been recorded in the meantime, is being viewed. When the end of the recording is reached, an automatic jump is made back to the broadcast mode, by the television program being passed directly to the set-top box or to the television output appliance.

Additional items or additional programs can be produced, as indicated schematically in FIG. 2, at the output of the analysis unit A at start and end times which are determined externally and at start and end times which are determined internally in real time. The television viewer is offered the variants of the recording and replay function by means of a control menu which have control functions B1(I1), B11(I1). . . . , see FIG. 4. Control menu modules are, for example, recorded without additional programs/additional items, with a television program being recorded from the time of activation of the control menu, and the additional item indication such as the start and end times of the additional programs Wx being evaluated. In this way, the information blocks that are not in the core program are not all emitted on output. It is also possible for the advertisement blocks not to be collected and to be called up by the viewer at another time, since they need not be stored in this mode. However, this is permitted by an option for recording with additional items. In addition to the activation and deactivation of the variant in the recording function as described above and to the other control functions which are normal for recorders, such as monitor output, trick play, etc., the television viewer is offered, for example and as indicated above, at least one first, second and further control function B1, B2, B11, B12, . . . such as Play Record and Resume Real Time Broadcast, resulting in the output of the recorded content and the changeover to the broadcast mode for the recorded program.

Figure 4:
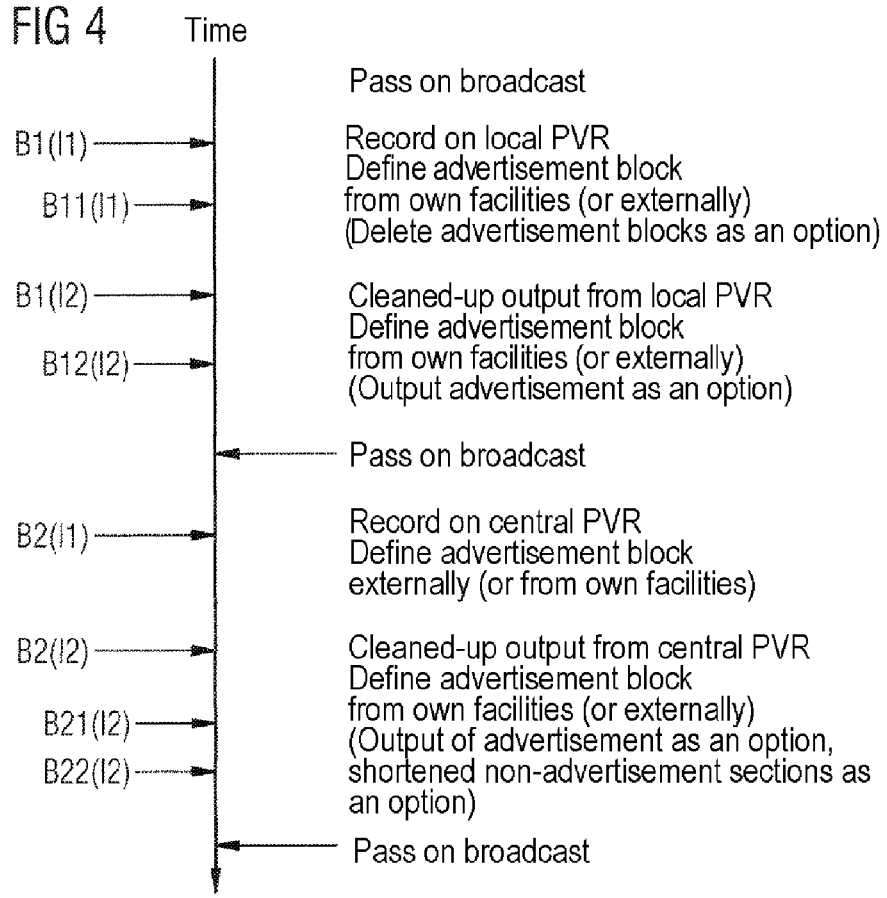
FIG. 4 shows a list of control functions.

FIG. 4 shows control functions. For example, the following control functions can be provided:

B1 (I1) recording on local personal video recorder,

B11 (I1) recording on local personal video recorder with deletion of a preselectable category of additional items, B1 (I2) output of the transmission items with automatic jump back, B12 (I2) output of the additional items with or without jump back, B2 (I1) recording on central personal video recorder, B2 (I2) output of the transmission items which have been temporarily stored on the central personal video recorder, with automatic jump back, B21 (I2) output of the preselectable additional items which have been temporarily stored on the central personal video recorder, and B2 2(I2) output of the transmission items in compressed form with automatic jump back.

Figure 5:
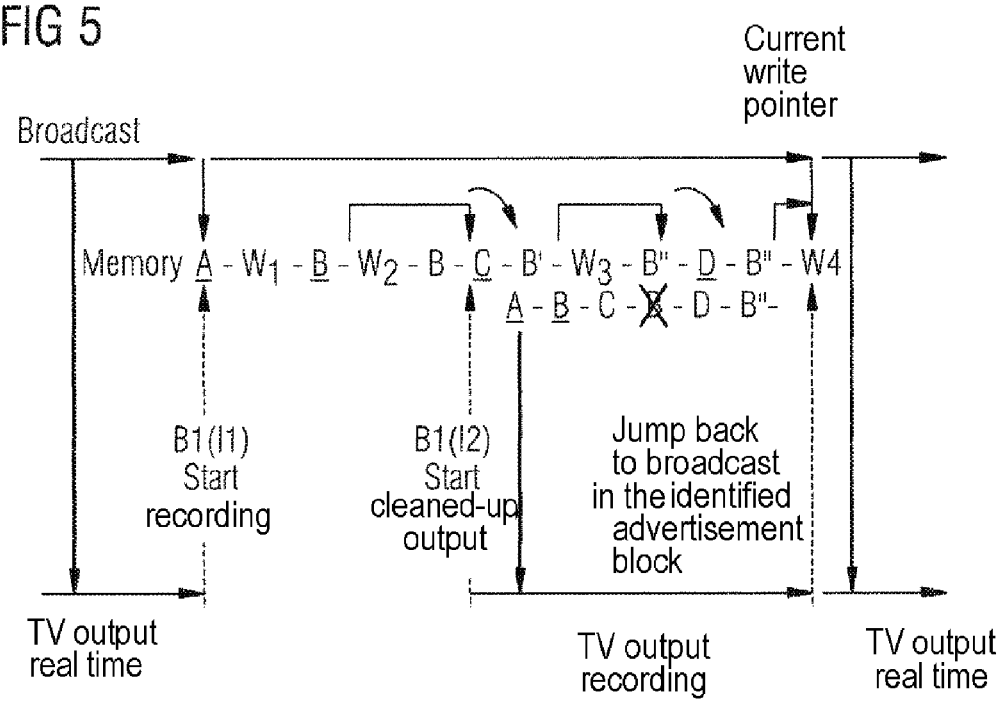
FIG. 5 shows a verified recording and replay arrangement.

FIG. 5 shows a schematic procedure for a method which is also used for advertisement block identification. This method can access an external advertisement block indication, and can optionally be supplemented by elimination of repeat sections after the end of the advertisement block. When a movie is interrupted by an advertisement block, a segment of the item which has already been broadcast is frequently repeated before it is actually continued. In this case, simple removal of advertisement blocks would lead to this segment being output twice, which is in general undesirable. FIG. 5 shows an example of the relationships. The segments B, B', B" are the elements respectively repeated after the advertisement blocks W1, W2, W3. Determination of the repeated sections B, B', B" requires some time and is therefore possible for sections from previous times. Functionally, there is therefore a pointer which points to the start of C on reaching the end of B. This also applies to the pointer at the end of B', which indicates the start of D. For the current advertisement block W4, there is just one pointer at the end of B", indicating the current write pointer for the broadcast program. If this is achieved, the changeover takes place after the broadcast, the subsequent section B" is part of the real-time output, and cannot be suppressed. The pointers shown in FIG. 5 can be implemented by means of suitable conversion tables using entries which in each case point to one of the blocks. These are used only for illustrative purposes.

Figure 6:
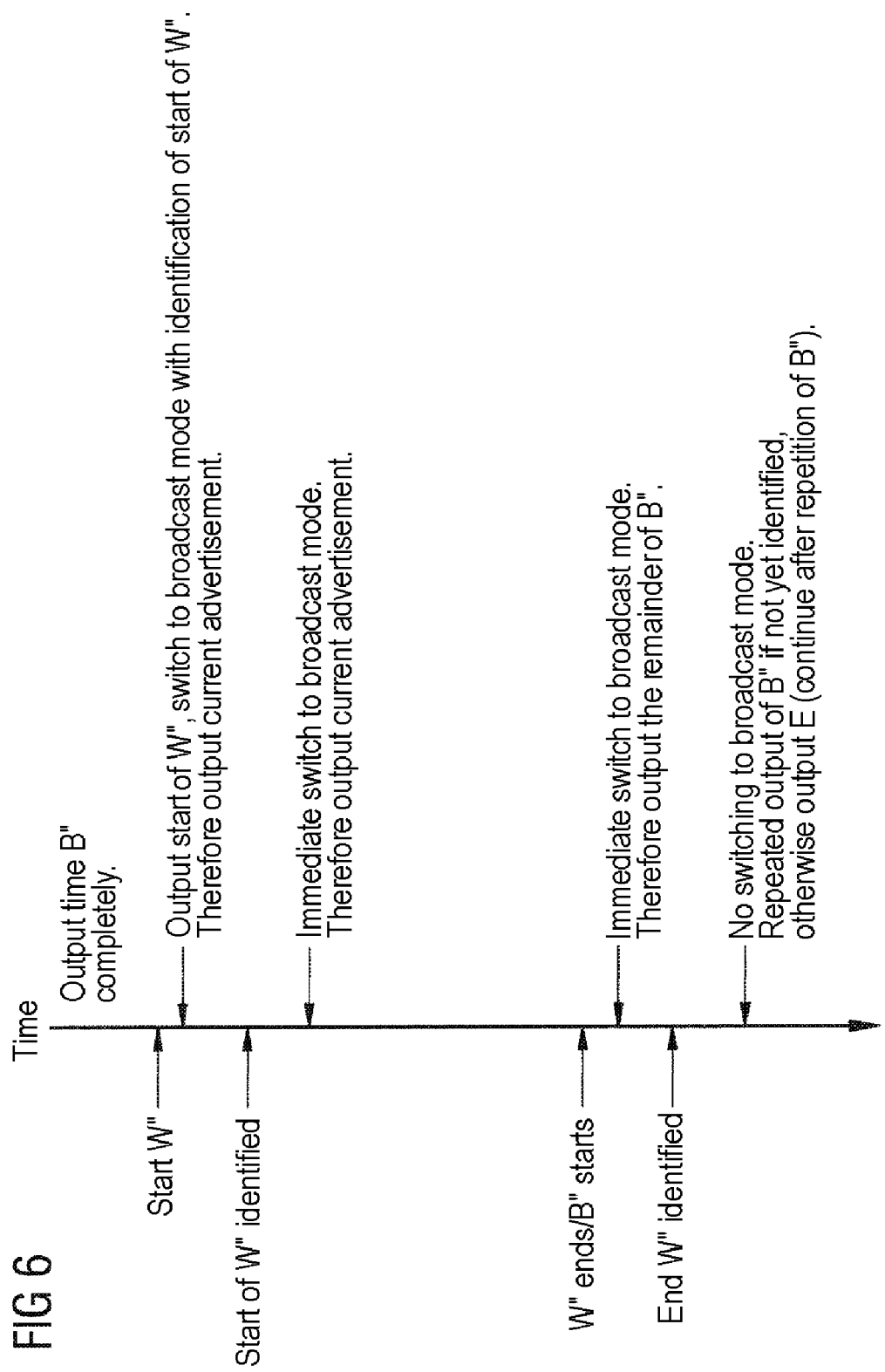
FIG. 6 shows a detailed analysis.

Building on FIG. 5, FIG. 6 shows the relationships in detail. In particular, the illustration shows the end of the segment B" being reached before the advertisement block W''' at times at which its start and end have not yet been identified.

The control functions B1, B2—for example recording without additional items—can also be activated once again before switching back to the broadcast mode. Repeated activation before the switching-back time is reached in the broadcast mode is possible. Manually controlled fast forward in order to speed up the jump back to the broadcast mode Bx can be provided as an option on the remote control FB or the multimedia appliance.

If required, the advertisement blocks recorded during the recording phase, or further information, can also be recorded and can be output on a piecemeal basis at a later time by operation of a further control function B12(I2) if required.

In particular, when a recording by a network-based personal video recorder nPVR is activated as a result of the start of an advertisement block, a network operator/service provider does not need to provide a recording on a user-specific basis, but can provide a recording for an entire user group. This means that, in some circumstances, all that is produced is a single program from which advertisement blocks have been removed, which could then be ended on a user-specific basis by a final user returning to the broadcast mode.

Applicability to other program items, other than advertisement blocks, can likewise be provided by said arrangement or the method. For better delineation, the program items are subdivided into categories. In order to verify his programs to be cleaned up, a multimedia subscriber can select one or more categories. Elimination of program items which are not desired on a user-specific basis could be achieved, provided that the items which are not desired can be identified or can be made identifiable in real time. Examples could be interviews during breaks in concerts or between the acts or scenes of operas, during the breaks between the halves of football matches, current music critics or word items in programs from music transmitters, etc.

Figure 7:
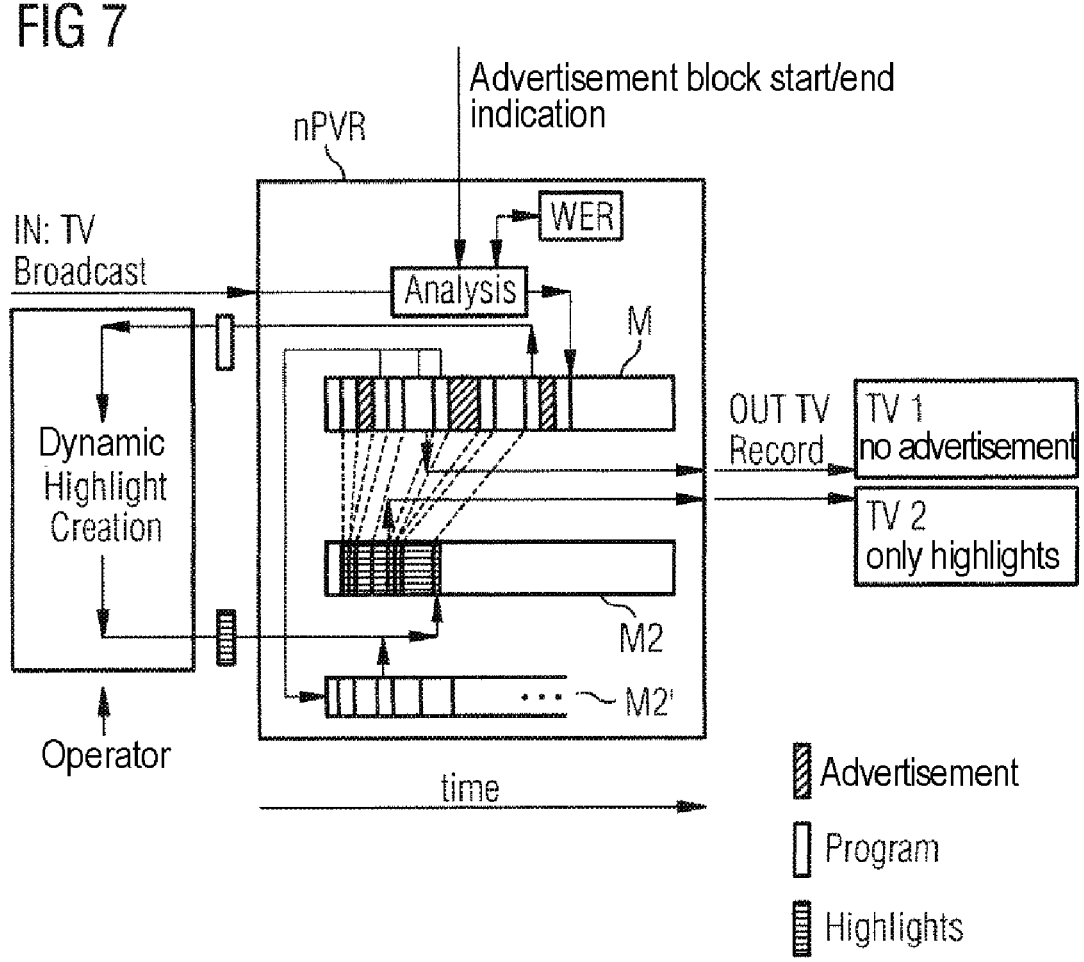
FIG. 7 shows a recording and replay arrangement for speeding up the process of returning to the real-time broadcast mode.

FIG. 7 shows a further exemplary embodiment in which the multimedia subscriber accesses temporarily stored revised or concentrated transmission sections for example by activation of a second initiation I2 of a further control function B22. These revised transmission sections, which are concentrated in particular on the basis of their information content and/or event content, are temporarily stored in further or central memory units. If the viewer accesses the recorded program at some time after the start of the advertisement block then current broadcasts can also be used in the current processed form. A viewer who has missed real x minutes from the desired program content without an advertisement block, will not receive the complete time output, for example x=10 minutes, from his service provider but also a summary, or a 3-minute long summary, of the respective last y (>x) minutes to be viewed. This summary is available for output in buffer stores, irrespective of the requirement profile. The selection of the processed summary then allows the television viewer to return to the real-time broadcast mode even more quickly. The summaries are produced such that they run at the same time manually for this output mode, which is restricted to the highlights. Since this takes some time, the summary sections that have been created are output first of all. When the output reaches a section for which the summary has not yet been created, a change is made to the unsummarized stored program information, from which advertisement elements have been removed, in order to produce the output without any gaps. As already described, a jump is then made back to the broadcast mode, when in this mode. The operator is provided with the output of the program which was broadcast in his absence and from which advertisement items or previously selected categories have been removed, by a local or central personal video recorder PVR, and with the version of the program from which advertisement items have been removed and which has additionally been shortened to the essential events, by a central PVR. A jump is made back to the broadcast mode as quickly as possible in both modes. In addition, combinations of both modes are possible. After returning to the television or returning to follow the interrupted program, the viewer can therefore first of all view the original version, from which the advertisement blocks have been removed. If this takes too long for him, he can initiate the continuation by means of the abbreviated version at any time. This means that a further output from which advertisements have been removed is produced from the local or central/network-based personal video recorder PVR until the next start of an abbreviated section is reached, which is produced via the central PVR. Subsequent abbreviated sections are then output automatically, depending on the availability. It is possible to return to the output of the original section at any time, as well, if the summarized sections were to fail, that is to say any desired change between the stated output modes is possible on the basis of the mode changeover at times at which a summarized section starts. In the case of current broadcasts such as live transmissions, the section-by-section summaries can be created and transmission sections which have been temporarily stored in separate memory areas can be called up. In the case of the transmission of movies and recordings, the summaries can be created a priori, and can likewise be temporarily stored. In particular in this case, summaries with a different extent of compression are feasible, which can then be provided via a central PVR function and can be called up by the subscriber in order to selectively return to the broadcast mode from the buffer store at different speeds. In this case as well, the output mode can be changed at any desired point before jumping back to the real-time broadcast mode, on the basis of the start of a program section that exists in the various abbreviated forms.

What is claimed is:

1. An apparatus comprising:
a physical receiving unit (E) adapted to scan a program (B) from plurality of programs (Bx); wherein:
after initiation of a first control function (B1, B2, . . . ) via a control unit, transmission sections (a, b, c, d, . . . ), which do not contain any additional programs are extracted from said program (B) and temporarily stored, said transmission sections lacking a plurality of additional programs (W1, W2, W3, . . .) previously inserted within said program (B);

after initiation of a second control function via the control unit, the temporarily stored transmission sections (a, b, c, d, . . .) and a summarization of said transmission sections are provided to an output unit (TV) that is adapted for viewing a plurality of programs (Bx) after which said program or a subsequent program (Bx, By) is then provided to the output unit (TV); and the transmission sections (a, b, c, . . .) are combined on the basis of their information content or event content and stored in a buffer store for access as required, said summarization of said transmission sections (a,b,c,. . .)based on their information content or event content.

2. The apparatus as claimed in claim 1, wherein:

said receiving unit (E) comprises a memory unit (M) comprising a first memory section adapted for temporary storage of said transmission sections (a, b, c, . . .), said memory unit (M) comprising a second memory section adapted for temporary storage of the plurality of additional programs (W1, W2, W3, . . .).

3. The apparatus as claimed in claim 1, wherein:

the receiving unit (E) comprises an analysis unit (A) adapted for identification of a start time and an end time of each of the plurality of additional programs (W1, W2, W3, . . .).

4. The apparatus as claimed in claim 1, wherein:

said apparatus comprises an access unit (Z) adapted to be coupled to a transmission medium via which information relating to a start time and an end time of each of the plurality of additional programs (W1, W2, W3, . . .) is provided to the analysis unit (A), and said analysis unit (A) is adapted to separate said transmission sections (a, b, c . . .) of said program (B) by said start time and end time of each of the plurality of additional programs (W1, W2, W3, . . .).

5. The apparatus as claimed in claim 1, wherein:

said receiving unit (E) is adapted to temporarily store any of a plurality of additional transmission sections (. . ., d, e, . . .) of said program (B) that are transmitted while said transmission sections (a, b, c, . . .) are being replayed.

6. The apparatus as claimed in claim 1, further comprising:

a unit (WER) adapted for identifying a repeat section (B', . . .,) in said transmission sections (a, b, c, . . .) and adapted for masking out said repeat section from said program (B) by initiation of a third control function.

7. A method for viewing portions of a transmitted program (B), comprising:

via a first control function (B1, B2, . . .) issued by a control unit, initiating temporary storage of transmission sections (a, b, c, d, . . .), which do not contain any additional programs that have been inserted in the transmitted program and which have been extracted from the transmitted program (B);

via a second control function (B1, B2, . . .) issued by said control unit, initiating transfer, to an output unit (TV), of said temporarily stored transmission sections (a, b, c, d, . . .) and of a summarization of said transmission sections based on their information content or event content, wherein said transmission sections (a, b, c, d, . . .) are combined based on their information content or event content.

8. The method as claimed in claim 7, wherein:

said transmission sections (a, b, c, . . .) and said additional programs (W1, W2, W3, . . .) are temporarily stored.

9. The method as claimed in claim 7, further comprising:

determining a start time and an end time of each of said additional programs (W1, W2, W3, . . .).

10. The method as claimed in claim 7, wherein:

an externally determined start time and end time of each of said additional programs (W1, W2, W3,. . .) are used for separation of transmission sections (a, b, c . . .).

11. The method as claimed in claim 7, further comprising:

temporarily storing additional transmission sections (. . ., d, e, . . .) of said program that are transmitted while said transmission sections (a, b, c, . . .) are being replayed.

12. The method as claimed in claim 7, further comprising:

masking out a repeat section (B') from the transmitted program (B.

\* \* \* \* \*